(12) United States Patent
McConville et al.

(10) Patent No.: US 11,565,516 B2
(45) Date of Patent: Jan. 31, 2023

(54) FOUNTAIN SOLUTION THICKNESS MEASUREMENT USING PHASE SHIFTED LIGHT INTERFERENCE IN A DIGITAL LITHOGRAPHY PRINTING SYSTEM

(71) Applicant: Xerox Corporation, Norwalk, CT (US)

(72) Inventors: Paul J. McConville, Webster, NY (US);
Chu-heng Liu, Penfield, NY (US);
Jason M. LeFevre, Penfield, NY (US);
Seemit Praharaj, Webster, NY (US);
Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 6 days.

(21) Appl. No.: 17/137,626

(22) Filed: Dec. 30, 2020

(65) Prior Publication Data

US 2022/0203671 A1 Jun. 30, 2022

(51) Int. Cl.
*B41F 31/02* (2006.01)
*B41F 7/20* (2006.01)
*G01B 11/06* (2006.01)

(52) U.S. Cl.
CPC .............. *B41F 31/022* (2013.01); *B41F 7/20* (2013.01); *G01B 11/0675* (2013.01); *B41P 2227/70* (2013.01)

(58) Field of Classification Search
CPC ...... B41F 31/022; B41F 7/20; B41P 2227/20; G01B 11/0675
USPC ........................................................ 101/364
See application file for complete search history.

(56) References Cited

U.S. PATENT DOCUMENTS

| | | | | |
|---|---|---|---|---|
| 4,151,796 A * | 5/1979 | Uhrig | ........................ | B41F 7/24 101/142 |
| 6,832,550 B2 * | 12/2004 | Martin | ................ | B41F 33/0063 101/349.1 |
| 7,545,503 B2 * | 6/2009 | Aiyer | ................. | G01B 11/0675 356/485 |
| 8,575,551 B2 * | 11/2013 | Dotzel | ................ | B41F 33/0063 250/339.11 |
| 2001/0011510 A1 * | 8/2001 | Koehler | ................ | B41F 31/022 101/350.1 |
| 2012/0103212 A1 * | 5/2012 | Stowe | ................... | B41F 31/045 101/147 |
| 2017/0092033 A1 * | 3/2017 | Stewart | ................ | G07D 7/2016 |

OTHER PUBLICATIONS

Co-Pending U.S. Appl. No. 17/137,516, filed Dec. 30, 2020.
Co-Pending U.S. Appl. No. 17/137,711, filed Dec. 30, 2020.
Co-Pending U.S. Appl. No. 17/137,473, filed Dec. 30, 2020.

(Continued)

*Primary Examiner* — Leslie J Evanisko
*Assistant Examiner* — Leo T Hinze
(74) *Attorney, Agent, or Firm* — Caesar Rivise, PC

(57) ABSTRACT

According to aspects of the embodiments, there is provided a method of measuring the amount of fountain solution employed in a digital offset lithography printing system. Fountain solution thickness is measured by using phase shifted monochromic light to produce optical path differences through the fountain solution film. The intensity of the reflected light through the fountain solution film is very sensitive due to the phase shifted light so interference fringes are easier to delineate and fountain solution thickness measurement more reliable.

16 Claims, 10 Drawing Sheets

(56) References Cited

OTHER PUBLICATIONS

Co-ending U.S. Appl. No. 16/917,044, filed Jun. 30, 2020.
Co-Pending U.S. Appl. No. 16/916,907, filed Jun. 30, 2020.
Co-Pending U.S. Appl. No. 16/913,626, filed Jun. 26, 2020.
Co-Pending U.S. Appl. No. 16/913,351, filed Jun. 26, 2020.
Co-Pending U.S. Appl. No. 16/913,302, filed Jun. 26, 2020.

* cited by examiner

FOUNTAIN SOLUTION THICKNESS MEASUREMENT USING PHASE SHIFTED LIGHT INTERFERENCE IN A DIGITAL LITHOGRAPHY PRINTING SYSTEM

FIELD OF DISCLOSURE

This invention relates generally to digital printing systems, and more particularly, to fountain solution deposition systems and methods for measuring the thickness of the fountain solution.

BACKGROUND

Conventional lithographic printing techniques cannot accommodate true high speed variable data printing processes in which images to be printed change from impression to impression, for example, as enabled by digital printing systems. The lithography process is often relied upon, however, because it provides very high quality printing due to the quality and color gamut of the inks used. Lithographic inks are also less expensive than other inks, toners, and many other types of printing or marking materials.

Ink-based digital printing uses a variable data lithography printing system, or digital offset printing system, or a digital advanced lithography imaging system. A "variable data lithography system" is a system that is configured for lithographic printing using lithographic inks and based on digital image data, which may be variable from one image to the next. "Variable data lithography printing," or "digital ink-based printing," or "digital offset printing," or digital advanced lithography imaging is lithographic printing of variable image data for producing images on a substrate that are changeable with each subsequent rendering of an image on the substrate in an image forming process.

For example, a digital offset printing process may include transferring ink onto a portion of an imaging member (e.g., fluorosilicone-containing imaging member, imaging blanket, printing plate) that has been selectively coated with a fountain solution (e.g., dampening fluid) layer according to variable image data. According to a lithographic technique, referred to as variable data lithography, a non-patterned reimageable surface of the imaging member is initially uniformly coated with the fountain solution layer. An imaging system then evaporates regions of the fountain solution layer in an image area by exposure to a focused radiation source (e.g., a laser light source, high power laser) to form pockets. A temporary pattern latent image in the fountain solution is thereby formed on the surface of the digital offset imaging member. The latent image corresponds to a pattern of the applied fountain solution that is left over after evaporation. Ink applied thereover is retained in the pockets where the laser has vaporized the fountain solution. Conversely, ink is rejected by the plate regions where fountain solution remains. The inked surface is then brought into contact with a substrate at a transfer nip and the ink transfers from the pockets in the fountain solution layer to the substrate. The fountain solution may then be removed, a new uniform layer of fountain solution applied to the printing plate, and the process repeated.

Digital printing is generally understood to refer to systems and methods of variable data lithography, in which images may be varied among consecutively printed images or pages. "Variable data lithography printing," or "ink-based digital printing," or "digital offset printing" are terms generally referring to printing of variable image data for producing images on a plurality of image receiving media substrates, the images being changeable with each subsequent rendering of an image on an image receiving media substrate in an image forming process. "Variable data lithographic printing" includes offset printing of ink images generally using specially-formulated lithographic inks, the images being based on digital image data that may vary from image to image, such as, for example, between cycles of an imaging member having a reimageable surface.

The inventors have found that the amount or thickness of the fountain layer which is present on the printing plate is a critical part of digital offset printing methods in order to maintain sharp and clear images. The layer is extremely thin, on the order of tens of nanometers, which until now any direct measurement of its thickness difficult. Knowledge of the layer thickness is helpful to control the system image quality. For example, if insufficient fountain solution is provided to a non-image area, the ink will invade the non-image area to create a distorted printing image. Conversely, if too much fountain solution is provided so that the fountain solution enters the image area, a distortion of the image will also result.

The amount or thickness of fountain solution which is applied to the printing plates is therefore critical to the production of clear printed images. Currently, the amount of fountain solution which is applied to the plates used in offset lithography is based principally on the experience of the offset press operator. There is to date no accurate method of quantifying the amount of fountain solution used in offset lithography printing processes so as to minimize the undesirable effects of too much or too little fountain solution.

It would therefore be a significant advance in the art of digital offset printing if the amount of fountain solution which is used in the marking process could be quantified without disrupting the operation of the printing process.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a fountain solution thickness measurement system. The measurement system for thin liquid film, such as fountain solution, uses phase shifted monochromic light to produce Optical Path Differences through the fountain solution film; measurement can be done at an imaging blanket/donor roll, or transferred from the imaging blanket to this highly engineered optical gating surface for fast, high spatial resolution and accurate thickness measurement.

The proposed optical gating surface holds the film on its substantially reflective surface so as to enable interference analysis. When a minute amount liquid film like fountain solution is deposited on this surface, the light reflected from the upper and lower surfaces will interfere. The degree of constructive or destructive interference between the two light waves depends on the difference in their phase. This difference in turn depends on the thickness of the film layer, the refractive index of the film, and the angle of incidence of the original wave on the fountain solution film.

In another aspect it is proposed the transfer of the fountain solution to be measured from the imaging blanket to a well-controlled substrate/surface for accurate measurement to overcome environmental and usage degradation due to un-controlled surface properties (topography, color, silicone oil presence, contaminations from ink, paper debris and the like, and wear and tear). Transferring the fountain solution from this un-controlled blanket surface to high quality engineered surfaces can enable several good measurement systems, many of which can be based on known technologies. Additionally, it is proposed to include measurements at various locations, and a wide range of different capabilities, such as from a one-time point spot measurement to an inline full width continuous monitoring system.

According to aspects illustrated herein, an exemplary method to measure fountain solution thickness for variable data lithography printing comprising radiate with an extended phase shifted monochromatic light source a measurement point of an optical gating surface saturated with fountain solution; receive reflected light from a top surface of the fountain solution and from the measurement point using an optical system, while the light reflected from the measurement point is received after traveling through the fountain solution at the optical gating surface; wherein the received reflected light forms an interference pattern obtained by an optical path length differences associated with the reflected light from the top surface and measurement point; and determine thickness of the fountain solution at the optical gating surface based on reflected light intensity at the interference pattern.

According to aspects described herein, a system useful for printing with an ink-based digital image forming comprising a light source for outputting an extended phase shifted monochromatic light source a measurement point of an optical gating surface saturated with fountain solution; an optical subsystem to receive reflected light from a top surface of the fountain solution and from the measurement point, while the light reflected from the measurement point is received after traveling through the fountain solution at the optical gating surface; wherein the received reflected light forms an interference pattern obtained by an optical path length differences associated with the reflected light from the top surface and measurement point; a processor; and a storage device coupled to the processor, wherein the storage device comprises instructions which, when executed by the processor, cause the processor to determine fountain solution thickness for variable data lithography printing by: determining thickness of the fountain solution at the optical gating surface based on reflected light intensity at the interference pattern.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
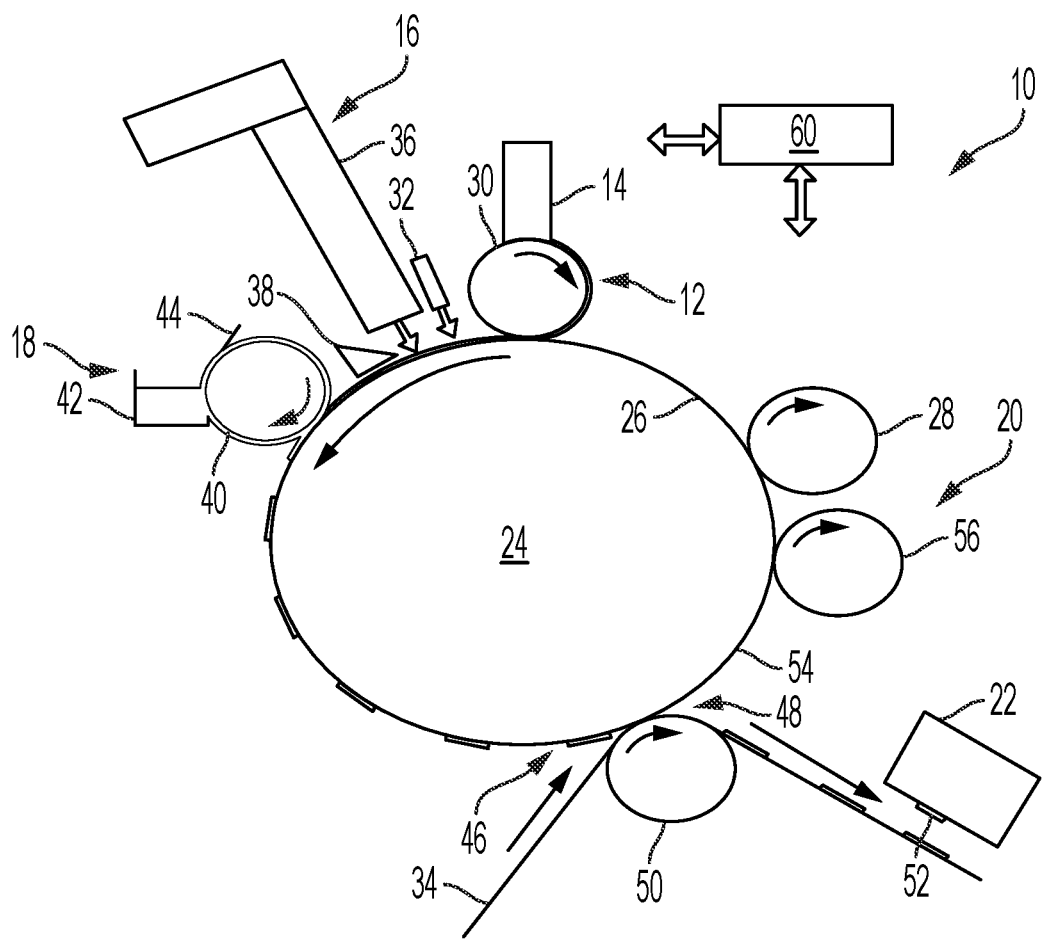
FIG. 1 is block diagram of a digital image forming device in accordance with examples of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for inking from an inking member to the reimageable surface of a digital imaging member.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "controller" is used herein generally to describe various apparatus such as a computing device relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The terms "media", "print media", "print substrate" and "print sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, and foils, as readily understood by a skilled artisan.

The term "image forming device", "printing device" or "printing system" as used herein may refer to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

The term "fountain solution" or "dampening fluid" refers to dampening fluid that may coat or cover a surface of a structure (e.g., imaging member, transfer roll) of an image forming device to affect connection of a marking material (e.g., ink, toner, pigmented or dyed particles or fluid) to the surface. The fountain solution may include water optionally with small amounts of additives (e.g., isopropyl alcohol, ethanol) added to reduce surface tension as well as to lower evaporation energy necessary to support subsequent laser patterning. Low surface energy solvents, for example volatile silicone oils, can also serve as fountain solutions. Fountain solutions may also include wetting surfactants, such as silicone glycol copolymers. The fountain solution may include D4 or D5 dampening fluid alone, mixed, and/or with wetting agents. The fountain solution may also include Isopar G, Isopar H, Dowsil OS20, Dowsil OS30, and mixtures thereof.

The term "optical gating surface" refers to a sensor which comprises an optical grating or surface relief comprised of a material having a high refractive index, a substrate layer that supports the optical grating, and may include one or more specific binding substances immobilized on the surface of the optical grating opposite of the substrate layer. A narrow band of optical wavelengths can be reflected from the sensor or optical device when the sensor is illuminated with a broad band of optical wavelengths such as from a laser or light emitting diode (LED).

Inking systems or devices may be incorporated into a digital offset image forming device architecture so that the inking system is arranged about a central imaging plate, also referred to as an imaging member. In such a system, the imaging member, including a central drum or cylinder is provided with a reimageable layer. This blanket layer has specific properties such as composition, surface profile, and so on so as to be well suited for receipt and carrying a layer of a fountain solution. A surface of the imaging member is reimageable making the imaging member a digital imaging member. The surface is constructed of elastomeric materials and conformable. A paper path architecture may be situated adjacent the imaging member to form a media transfer nip.

A layer of fountain solution may be applied to the surface of the imaging member by a dampening system. In a digital evaporation step, particular portions of the fountain solution layer applied to the surface of the imaging member may be evaporated by a digital evaporation system. For example, portions of the fountain solution layer may be vaporized by an optical patterning subsystem such as a scanned, modulated laser that patterns the fluid solution layer to form a latent image. In a vapor removal step, the vaporized fountain solution may be collected by a vapor removal device or vacuum to prevent condensation of the vaporized fountain solution back onto the imaging plate.

In an inking step, ink may be transferred from an inking system to the surface of the imaging member such that the ink selectively resides in evaporated voids formed by the patterning subsystem in the fountain solution layer to form an inked image. In an image transfer step, the inked image is then transferred to a print substrate such as paper via pressure at the media transfer nip.

In a variable lithographic printing process, previously imaged ink must be removed from the imaging member surface to prevent ghosting. After an image transfer step, the surface of the imaging member may be cleaned by a cleaning system so that the printing process may be repeated. For example, tacky cleaning rollers may be used to remove residual ink and fountain solution from the surface of the imaging member. The inking, transferring, and cleaning process causes the properties of the imaging member or imaging blanket to undergo wear and tear causing changes through the life of the blanket. Property changes of the blanket create a huge variability that makes thin film thickness measurement a difficult or daunting task.

FIG. 1 depicts an exemplary ink-based digital image forming device 10. The image forming device 10 may include dampening station 12 having fountain solution applicator 14, optical patterning subsystem 16, inking apparatus 18, and a cleaning device 20. The image forming device 10 may also include one or more rheological conditioning subsystems 22 as discussed, for example, in greater detail below. FIG. 1 shows the fountain solution applicator 14 arranged with a digital imaging member 24 having a reimageable surface 26. While FIG. 1 shows components that are formed as rollers, other suitable forms and shapes may be implemented.

The imaging member surface 26 may be wear resistant and flexible. The surface 26 may be reimageable and conformable, having an elasticity and durometer, and sufficient flexibility for coating ink over a variety of different media types having different levels of roughness. A thickness of the reimageable surface layer may be, for example, about 0.5 millimeters to about 4 millimeters. The surface 26 should have a weak adhesion force to ink, yet good oleophilic wetting properties with the ink for promoting uniform inking of the reimageable surface and subsequent transfer lift of the ink onto a print substrate.

The soft, conformable surface 26 of the imaging member 24 may include, for example, hydrophobic polymers such as silicones, partially or fully fluorinated fluorosilicones and FKM fluoroelastomers. Other materials may be employed, including blends of polyurethanes, fluorocarbons, polymer catalysts, platinum catalyst, hydrosilyation catalyst, etc. The surface may be configured to conform to a print substrate on which an ink image is printed. To provide effective wetting of fountain solutions such as water-based dampening fluid, the silicone surface need not be hydrophilic, but may be hydrophobic. Wetting surfactants, such as silicone glycol copolymers, may be added to the fountain solution to allow the fountain solution to wet the reimageable surface 26. The imaging member 24 may include conformable reimageable surface 26 of a blanket or belt wrapped around a roll or drum. The imaging member surface 26 may be temperature controlled to aid in a printing operation. For example, the imaging member 24 may be cooled internally (e.g., with chilled fluid) or externally (e.g., via a blanket chiller roll 28 to a temperature (e.g., about 10° C.-60° C.) that may aid in the image forming, transfer and cleaning operations of image forming device 10.

The reimageable surface 26 or any of the underlying layers of the reimageable belt/blanket may incorporate a radiation sensitive filler material that can absorb laser energy or other highly directed energy in an efficient manner. Examples of suitable radiation sensitive materials are, for example, microscopic (e.g., average particle size less than 10 micrometers) to nanometer sized (e.g., average particle size less than 1000 nanometers) carbon black particles, carbon black in the form of nano particles of, single or multi-wall nanotubes, graphene, iron oxide nano particles, nickel plated nano particles, etc., added to the polymer in at least the near-surface region. It is also possible that no filler material is needed if the wavelength of a laser is chosen so to match an absorption peak of the molecules contained within the fountain solution or the molecular chemistry of the outer surface layer. As an example, a 2.94 µm wavelength laser would be readily absorbed due to the intrinsic absorption peak of water molecules at this wavelength.

The fountain solution applicator 14 may be configured to deposit a layer of fountain solution onto the imaging member surface 26 directly or via an intermediate member (e.g., roller 30) of the dampening station 12. While not being limited to particular configuration, the fountain solution applicator 14 may include a series of rollers or sprays (not shown) for uniformly wetting the reimageable surface 26 with a uniform layer of fountain solution with the thickness of the layer being controlled. The series of rollers may be considered as dampening rollers or a dampening unit, for uniformly wetting the reimageable surface 26 with a layer of fountain solution. The fountain solution may be applied by fluid or vapor deposition to create a thin layer (e.g., between about 0.01 µm and about 1.0 µm in thickness, less than 5 µm, about 50 nm to 100 nm) of the fountain solution for uniform wetting and pinning.

A sensor 32, for example an in-situ non-contact laser gloss sensor or laser contrast sensor, may be used to confirm the uniformity of the layer. Such a sensor can be used to automate the dampening station 12. While not being limited to a particular utility, the sensor 32 may provide feedback to control the deposition of the fountain solution onto reimageable surface 26.

The optical patterning subsystem 16 is located downstream the fountain solution applicator 14 in the printing processing direction to selectively pattern a latent image in the layer of fountain solution by image-wise patterning using, for example, laser energy. For example, the fountain solution layer is exposed to an energy source (e.g. a laser) that selectively applies energy to portions of the layer to image-wise evaporate the fountain solution and create a latent "negative" of the ink image that is desired to be printed on a receiving substrate 34. Image areas are created where ink is desired, and non-image areas are created where the fountain solution remains. While the optical patterning subsystem 16 is shown as including laser emitter 36, it should be understood that a variety of different systems may be used to deliver the optical energy to pattern the fountain solution layer.

Still referring to FIG. 1, a vapor vacuum 38 or air knife may be positioned downstream the optical patterning subsystem to collect vaporized fountain solution and thus avoid leakage of excess fountain solution into the environment. Reclaiming excess vapor prevents fountain solution from depositing uncontrollably prior to the inking apparatus 18 and imaging member 24 interface. The vapor vacuum 38 may also prevent fountain solution vapor from entering the environment. Reclaimed fountain solution vapor can be condensed, filtered and reused as understood by a skilled artisan to help minimize the overall use of fountain solution by the image forming device 10.

Following patterning of the fountain solution layer by the optical patterning subsystem 16, the patterned layer over the reimageable surface 26 is presented to the inking apparatus 18. The inker apparatus 18 is positioned downstream the optical patterning subsystem 16 to apply a uniform layer of ink over the layer of fountain solution and the reimageable surface layer 26 of the imaging member 24. The inking apparatus 18 may deposit the ink to the evaporated pattern representing the imaged portions of the reimageable surface 26, while ink deposited on the unformatted portions of the fountain solution will not adhere based on a hydrophobic and/or oleophobic nature of those portions. The inking apparatus may heat the ink before it is applied to the surface 26 to lower the viscosity of the ink for better spreading into imaged portion pockets of the reimageable surface. For example, one or more rollers 40 of the inking apparatus 18 may be heated, as well understood by a skilled artisan. Inking roller 40 is understood to have a structure for depositing marking material onto the reimageable surface layer 26, and may include an anilox roller or an ink nozzle. Excess ink may be metered from the inking roller 40 back to an ink container 42 of the inker apparatus 18 via a metering member 44 (e.g., doctor blade, air knife).

Although the marking material may be an ink, such as a UV-curable ink, the disclosed embodiments are not intended to be limited to such a construct. The ink may be a UV-curable ink or another ink that hardens when exposed to UV radiation. The ink may be another ink having a cohesive bond that increases, for example, by increasing its viscosity. For example, the ink may be a solvent ink or aqueous ink that thickens when cooled and thins when heated.

Downstream the inking apparatus 18 in the printing process direction resides ink image transfer station 46 that transfers the ink image from the imaging member surface 26 to a print substrate 34. The transfer occurs as the substrate 34 is passed through a transfer nip 48 between the imaging member 24 and an impression roller 50 such that the ink within the imaged portion pockets of the reimageable surface 26 is brought into physical contact with the substrate 34.

Rheological conditioning subsystems 22 may be used to increase the viscosity of the ink at specific locations of the digital offset image forming device 10 as desired. While not being limited to a particular theory, rheological conditioning subsystem 22 may include a curing mechanism 52, such as a UV curing lamp (e.g., standard laser, UV laser, high powered UV LED light source), wavelength tunable photoinitiator, or other UV source, that exposes the ink to an amount of UV light (e.g., # of photons radiation) to at least partially cure the ink/coating to a tacky or solid state. The curing mechanism may include various forms of optical or photo curing, thermal curing, electron beam curing, drying, or chemical curing. In the exemplary image forming device 10 depicted in FIG. 1, rheological conditioning subsystem 22 may be positioned adjacent the substrate 34 downstream the ink image transfer station 46 to cure the ink image transferred to the substrate. Rheological conditioning subsystems 22 may also be positioned adjacent the imaging member surface 26 between the ink image transfer station 46 and cleaning device 20 as a preconditioner to harden any residual ink 54 for easier removal from the imaging member surface 26 that prepares the surface to repeat the digital image forming operation.

This residual ink removal is most preferably undertaken without scraping or wearing the imagable surface of the imaging member. Removal of such remaining fluid residue may be accomplished through use of some form of cleaning device 20 adjacent the surface 26 between the ink image transfer station 46 and the fountain solution applicator 14. Such a cleaning device 20 may include at least a first cleaning member 56 such as a sticky or tacky roller in physical contact with the imaging member surface 26, with the sticky or tacky roller removing residual fluid materials (e.g., ink, fountain solution) from the surface. The sticky or tacky roller may then be brought into contact with a smooth roller (not shown) to which the residual fluids may be transferred from the sticky or tacky member, the fluids being subsequently stripped from the smooth roller by, for example, a doctor blade or other like device and collected as waste. It is understood that the cleaning device 20 is one of numerous types of cleaning devices and that other cleaning devices designed to remove residual ink/fountain solution from the surface of imaging member 24 are considered within the scope of the embodiments. For example, the cleaning device could include at least one roller, brush, web, belt, tacky roller, buffing wheel, etc., as well understood by a skilled artisan.

Figure 9:
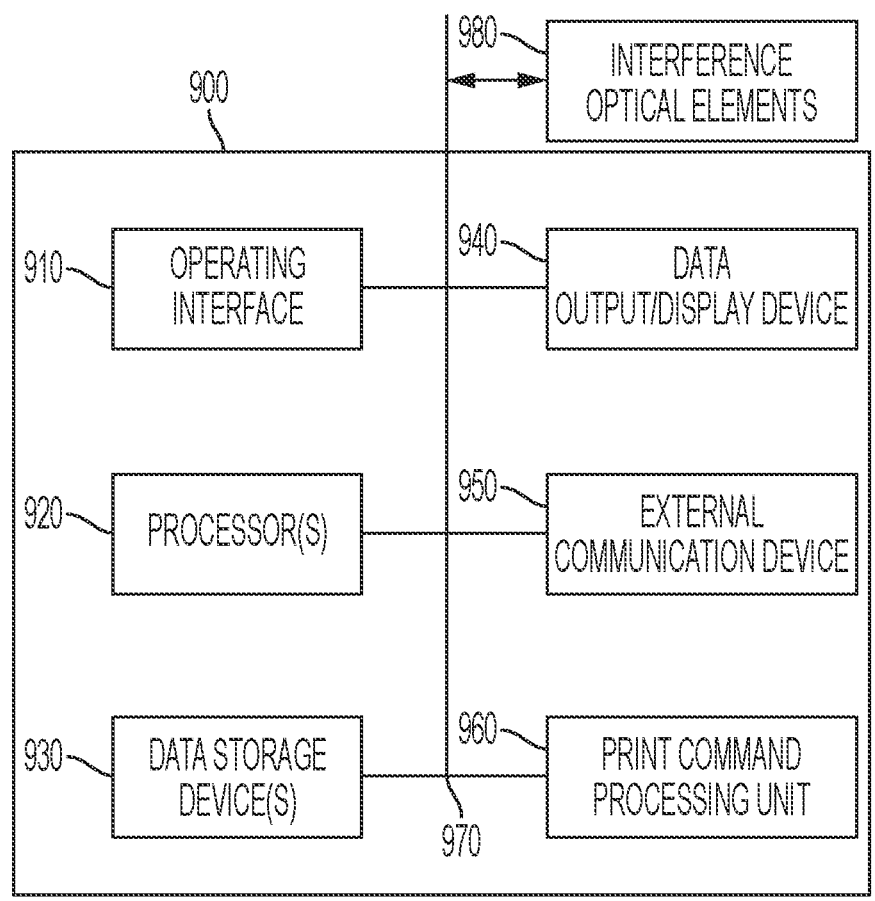
FIG. 9 is a block diagram of a controller with a processor for executing instructions to automatically control devices in the digital image forming device depicted in FIG. 1.

In the image forming device 10, functions and utility provided by the dampening station 12, optical patterning subsystem 16, inking apparatus 18, cleaning device 20, rheological conditioning subsystems 22, imaging member 24 and sensor 32 may be controlled, at least in part by controller 60 components which are shown and described in FIG. 9 as controller 900. Such a controller 60 is shown in FIG. 1 and may be further designed to receive information and instructions from a workstation or other image input devices (e.g., computers, smart phones, laptops, tablets, kiosk) to coordinate the image formation on the print substrate through the various subsystems such as the dampening station 12, patterning subsystem 16, inking apparatus 18, imaging member 24 and sensor 32 as discussed in greater detail below and understood by a skilled artisan.

Figure 2:
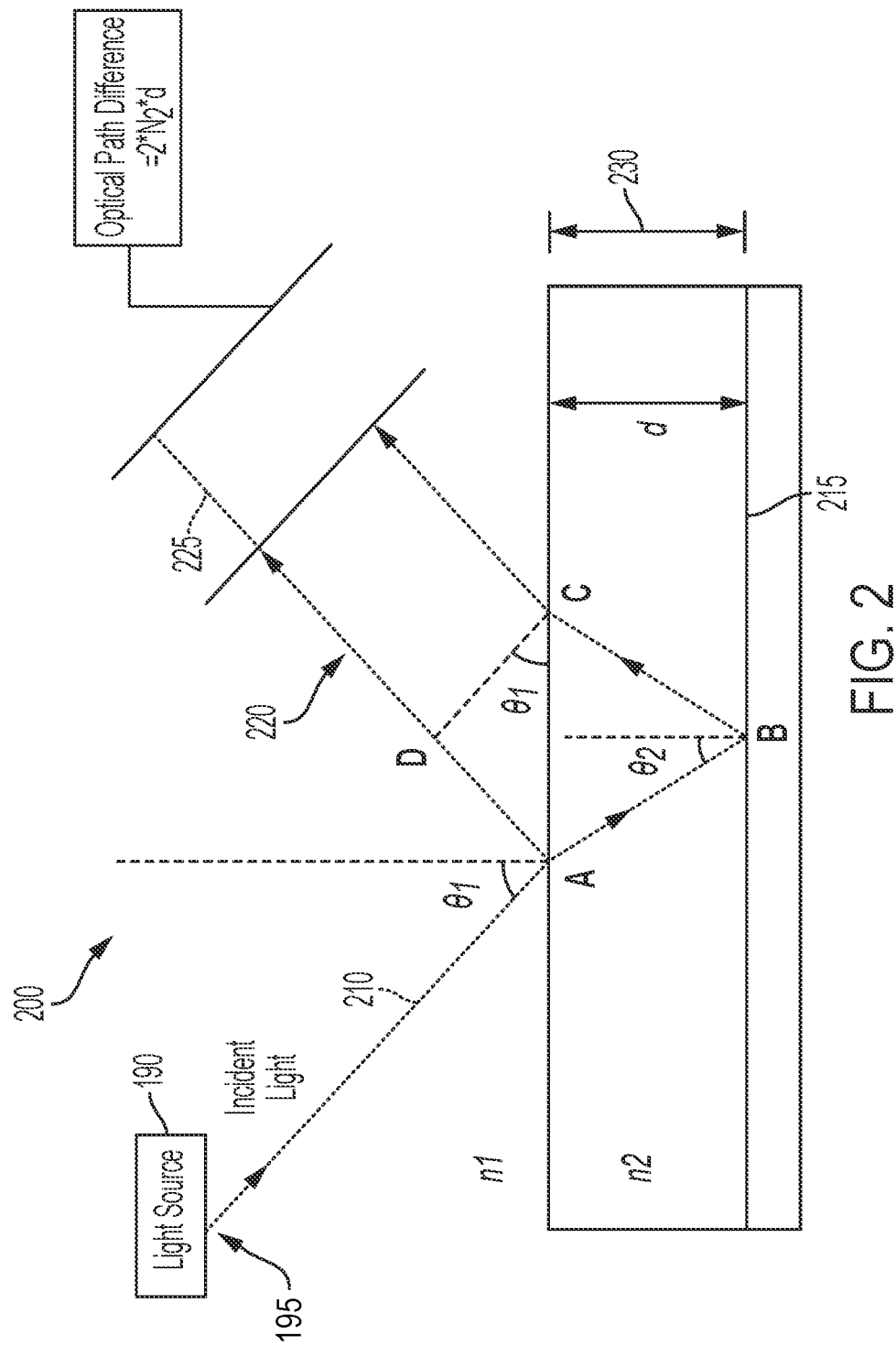
FIG. 2 shows a schematic view of an optical gating surface and optical path length difference for light reflected from the upper and lower boundaries of the fountain solution film in accordance to an embodiment.

FIG. 2 shows a schematic view of an optical gating surface and optical path length difference for light reflected from the upper and lower boundaries of the fountain solution film in accordance to an embodiment. In this embodiment, the FS measurement unit uses the optical gating surface 200 and from an external light source 190 a first amount of radiation 210 to create an interference pattern which correlates with fountain solution depth 230. The FS measurement unit includes a detector 980 shown at FIG. 9 such as a back-illuminated CCD having a surface upon which an interference pattern forms due to the reflected radiation 220. The detector creates an image of the pattern. Alternatively, the interference pattern caused by the reflections can be projected on paper for analyses and measurement by an aptly programmed computer or by an operator. The optical gating surface 200 can be used for measurement in non-printing region of the imaging blanket 24 or during non-printing cycles. One can attach a film strip of this grating material on the blanket. As vapor condensation occurs simultaneously on the blanket and the grating surface 200. One can measure the FS on the gating material 200 and infer the FS thickness on the blanket 24 based on the optical path difference (OPD) 225 between the surface reflection 220 and the reflection at the surface 215 of the optical gate 200.

The core principle of this embodiment is using two monochromatic light sources 195 from illumination source 190 with a constant phase shift that enhances the sensitivity of the light interference pattern obtained by the optical path length differences 225 associated with the fountain solution film thickness (d) 230. As light strikes the surface of the fountain solution film it is either transmitted (AB) or reflected (D) 220 at the upper surface. Light that is transmitted reaches the bottom surface 215 and is reflected (C) towards the surface of the fountain solution. The light reflected from the upper (D) and lower (C) surfaces will interfere. The degree of constructive or destructive interference between the two light waves depends on the difference in their phase. This difference in turn depends on the thickness of the fountain solution (FS) layer 230, the refractive index of the FS film (n2), and the angle of incidence ($\theta_1$) of the original wave on the fountain solution. Amplitude of the two lights phase shifted=A sin (wt)+A sin (wt+$\theta_1$)=2A Sin (wt)*Cos ($\theta_1$/2). The intensity of the two sources of light is modulated via Cos($\theta 1/2$) phase shift for better results. Setting $\theta_1$ equal to $2*\pi*OPD$/wavelength where OPD=$2*\pi 2*d$. So for 50 nm of fountain solution assuming a reflective index (n2) of 1.5 the wavelength of the light source should be at a wavelength of 400 nm which corresponds to blue light.

An optical gating surface 200 can be manufactured from a conventional DVD disc that has been split in half to remove the outer metalized layer. The transparent inner layer surface of the DVD has molded topographic pattern (grooves/pits) that behaves like an optical grating. The periodic topographic pattern has a spacing of 740 nanometers (0.740 microns) and grooves have a depth of a few tens of nanometers (nm) (for example 80 nano-meters) which is more than the required fountain solution thickness which is roughly 50 nm.

In operation, when the optical gating surface 200 is radiated with a light as the illumination source 190 that generates two monochromatic light sources 195 with a constant phase shift like determine above images can be taken at the different incidence angles of the source light. Beams having different incidence angles θ have different optical path differences. Thus, a circular interference fringe is generated on a screen disposed on the focal surface of an imaging media such as a lens by interference of the reflection lights D and C. A distance d from the center of interference fringe to an arbitrary point and the incidence angle θ have a relational expression, as follows: d=f·tan (θ). This interference fringe makes it suitable for image capturing such as with a CCD array or photo capture paper. The capture image can then be analyzed to yield a power spectrum of the interference band using Fourier conversion and/or by using the relative difference on a circular interference fringe such as Haidinger fringes to calculate the thickness of the fountain solution on the optical gating 200. The system would have good precisions for a range from a few nm to over 100 nm.

Figure 3:
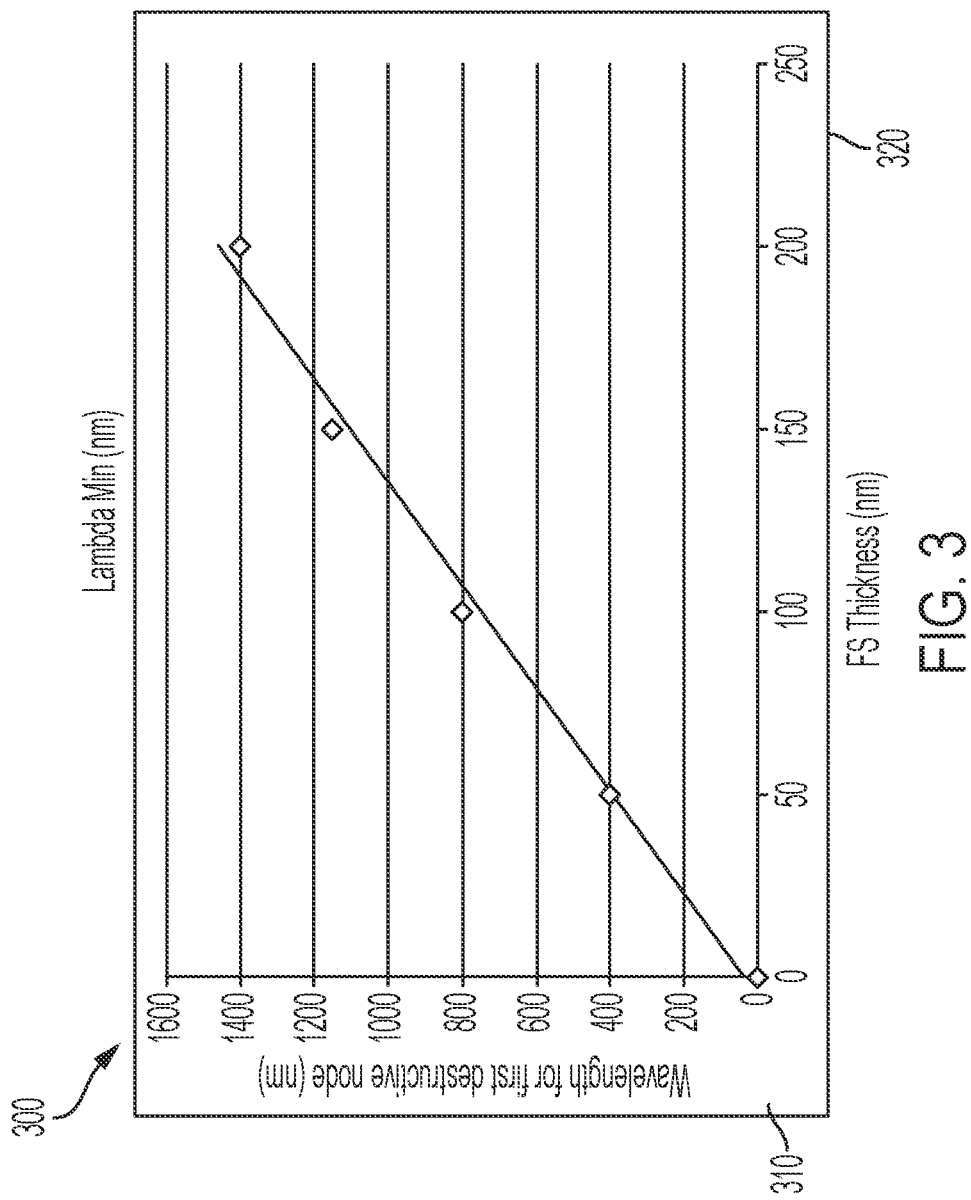
FIG. 3 is a graphical representation of wavelength for first destructive node as a function of fountain solution thickness using the optical gating surface of FIG. 2 in accordance to an embodiment.

FIG. 3 is a graphical representation of wavelength for first destructive node 310 as a function of fountain solution thickness 320 using the optical gating surface of FIG. 2 in accordance to an embodiment. As can be seen from the plot, for a first destructive interference for 50 nm of fountain solution, a wavelength of 400 nm, which corresponds to blue light, would be used assuming refractive index (n2) is 1.5 for the fountain solution. As a general rule the optical path difference (OPD) equals half the wavelength (λ) of the light source (λ/2).

FIG. 4 through FIG. 8 show different settings for placing and measuring fountain solution thickness. Concerning these figures the portions which are the same as those in a prior described embodiment such as in FIG. 1 and in FIG. 2 are denoted by the same reference numerals, and descriptions of the same portions as those as in a prior embodiment will be omitted.

Figure 4:
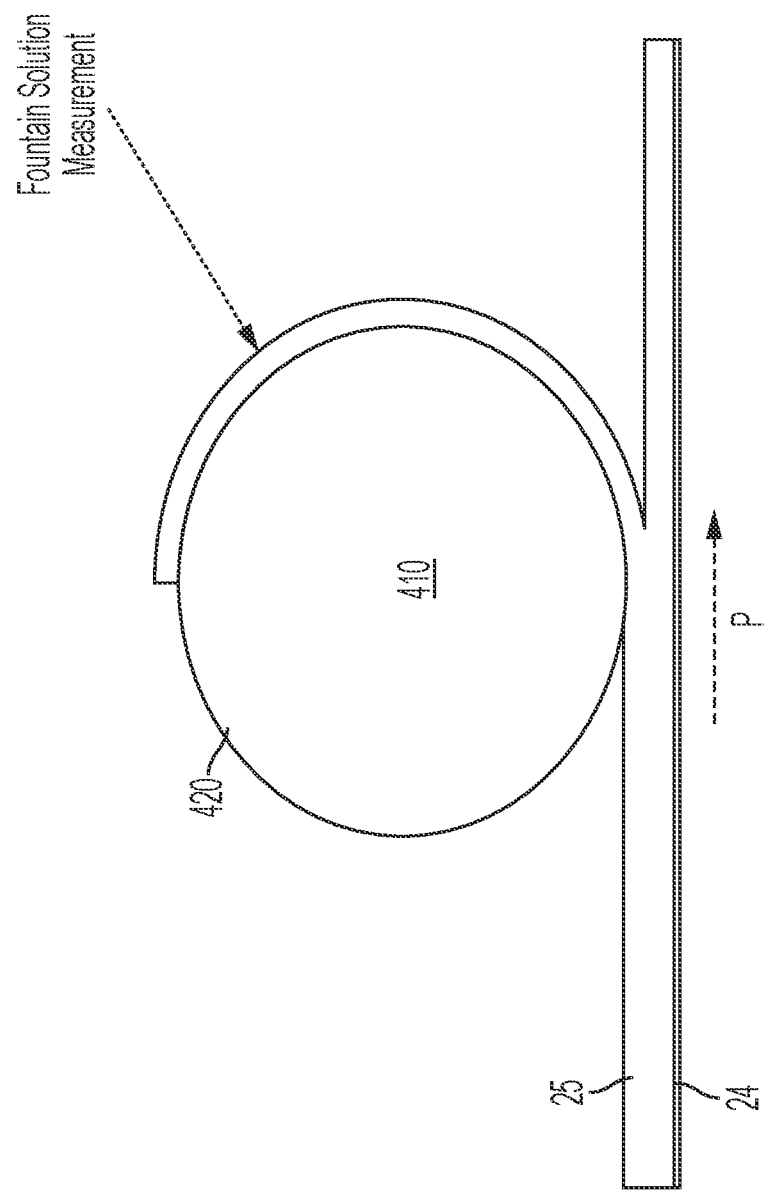
FIG. 4 shows a transfer of fountain solution from imaging blanket to a well-controlled substrate/surface for accurate measurement in accordance to an embodiment.

FIG. 4 shows a transfer of fountain solution from imaging blanket to a well-controlled substrate/surface for accurate measurement in accordance to an embodiment. In this embodiment, transfer of the fountain solution 25 from the imaging blanket to a well-controlled substrate/surface 420 for accurate measurement is shown. The first transfer method is a simple direct film splitting contact transfer from a face surface like blanket 24 and a roll 410 having the optical gating surface 200 on its surface 420. The thickness of the transferred film will be proportional to the film thickness on the original surfaces. Such an arrangement overcomes the variability of the surface properties of the blanket which is a factor that impacts film thickness sensing accuracy and viability. Therefore, transferring the fountain solution onto a well-engineered surface 410 can significantly simply the task. In addition, during the transfer process, there are known ways to even concentrate/thicken the film such that the subsequent measurement could be easily performed.

Figure 5:
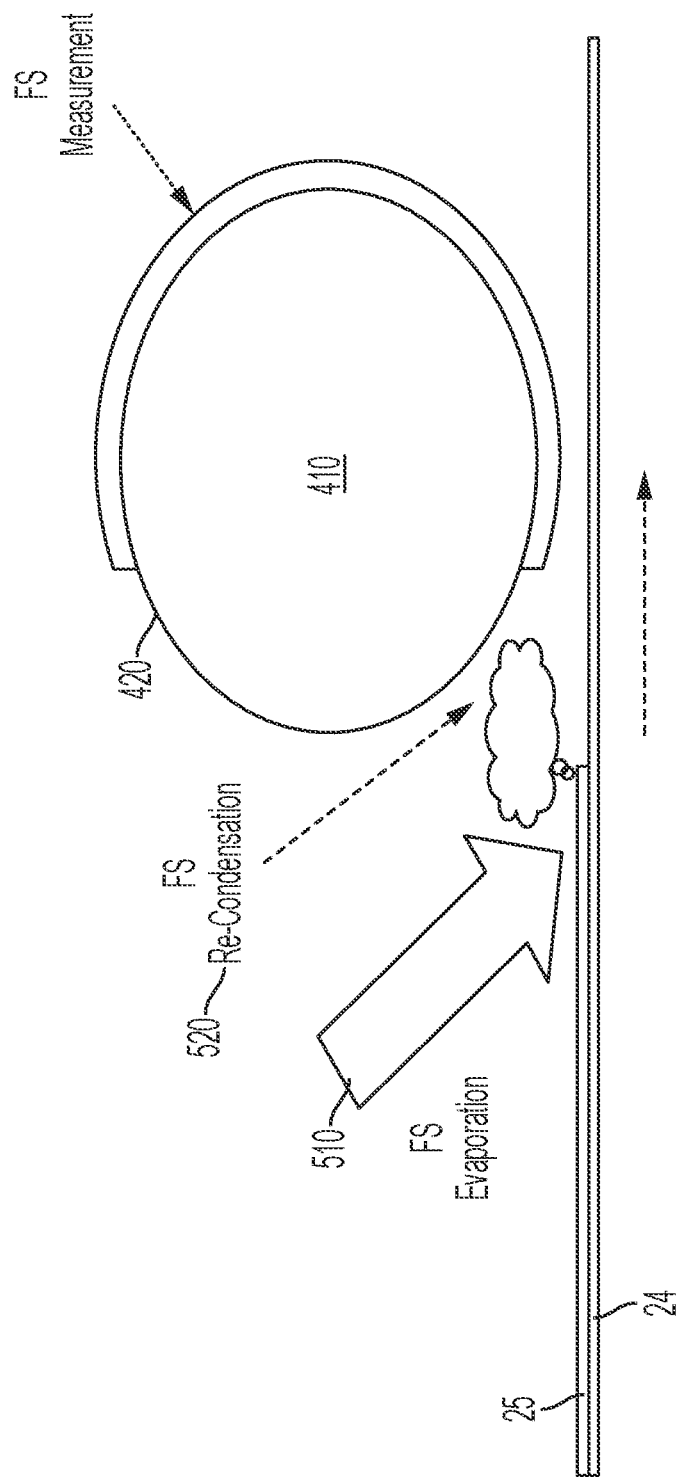
FIG. 5 shows a transfer using evaporation and condensation of fountain solution from imaging blanket to a well-controlled substrate/surface for accurate measurement in accordance to an embodiment.

FIG. 5 shows a transfer using evaporation and condensation of fountain solution from imaging blanket to a well-controlled substrate/surface for accurate measurement in accordance to an embodiment. The second method of transfer, from blanket to roll 410 having the optical gating surface 200 on its surface 420, is through evaporation and re-condensation on to roll 410.

The original fountain solution 25 is heated to evaporation 510 in close proximity of the transfer roll/member 410, which is kept at low temperature. The vapor will quickly re-condense 520 on the transfer roll surface 420. Subsequent film thickness measurement can be performed on the transfer roll surface using the optical gating surface 200. It should be noted, in this process of evaporation/re-condensation transfer, the transfer member 410 can operate in either direction. Additionally, the speed of the transfer member 410 can be significantly different from that of the original fountain solution carrier like imaging blanket 24. With variable speed and direction would provide the opportunity to concentrate/thicken the fountain solution on the transfer roll 410. For example, one can run the transfer roll at ⅒ the speed of the blanket 24. The fountain solution on the transfer member 410 will then be much thicker for easier measurements. Of course, one could also run the transfer roll 410 faster to obtain a thinner film if desired. Being able to thicken and thin the film during transfer can greatly enhance the dynamic range of the measurement system.

Figure 6:
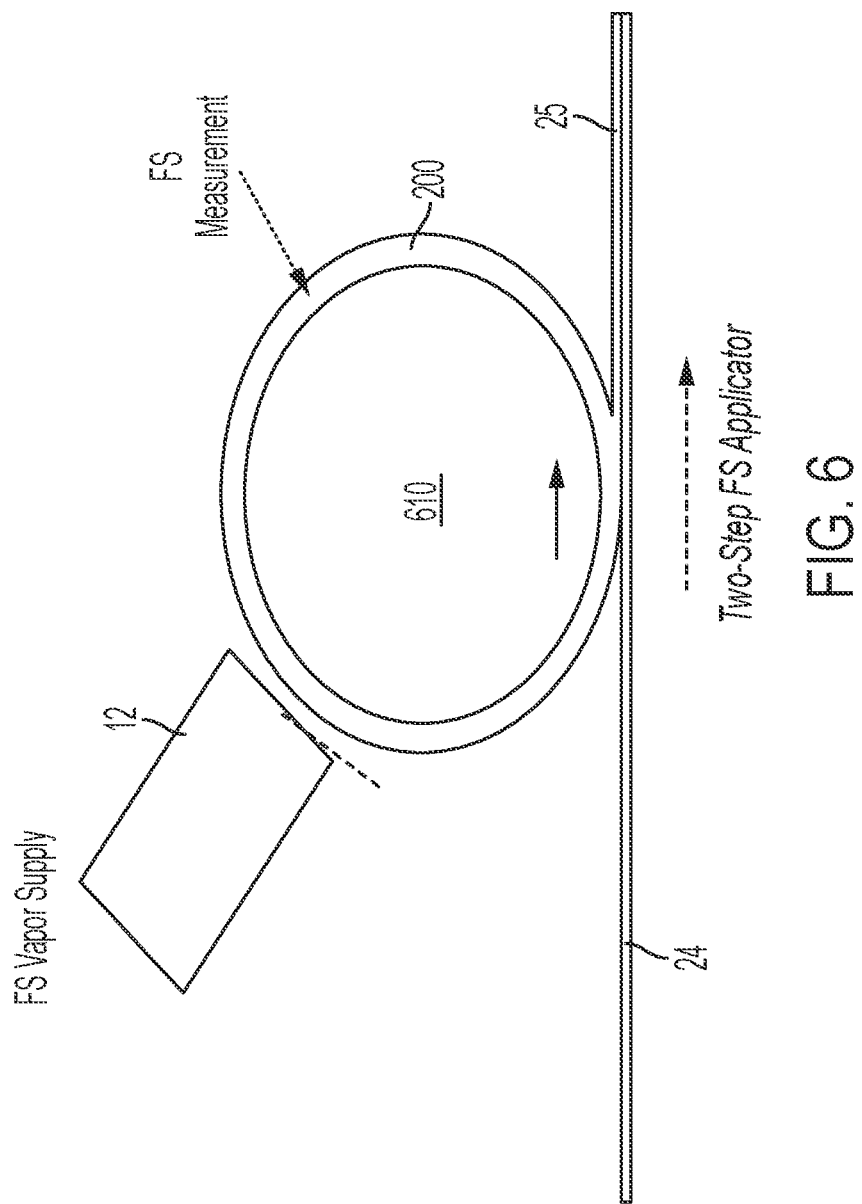
FIG. 6 shows direct measurement of the fountain solution thickness on a donor roll before transferring to imaging blanket in accordance to an embodiment.

FIG. 6 shows direct measurement of the fountain solution thickness on a donor roll before transferring to imaging blanket in accordance to an embodiment. Direct measurement of FS thickness on the donor roll 610 for a two-step FS applicator such as when fountain solution flows from vapor supply 12 to donor roll 610 and then to the imaging blanket 24. In this embodiment, the grating surface 200 is placed the donor roll 610 in a two-step FS applicator. The FS thickness can be directly measured from the donor roll surface. The FS on the blanket can be inferred to be transferred at the same thickness measured at the donor roll 610.

Figure 7:
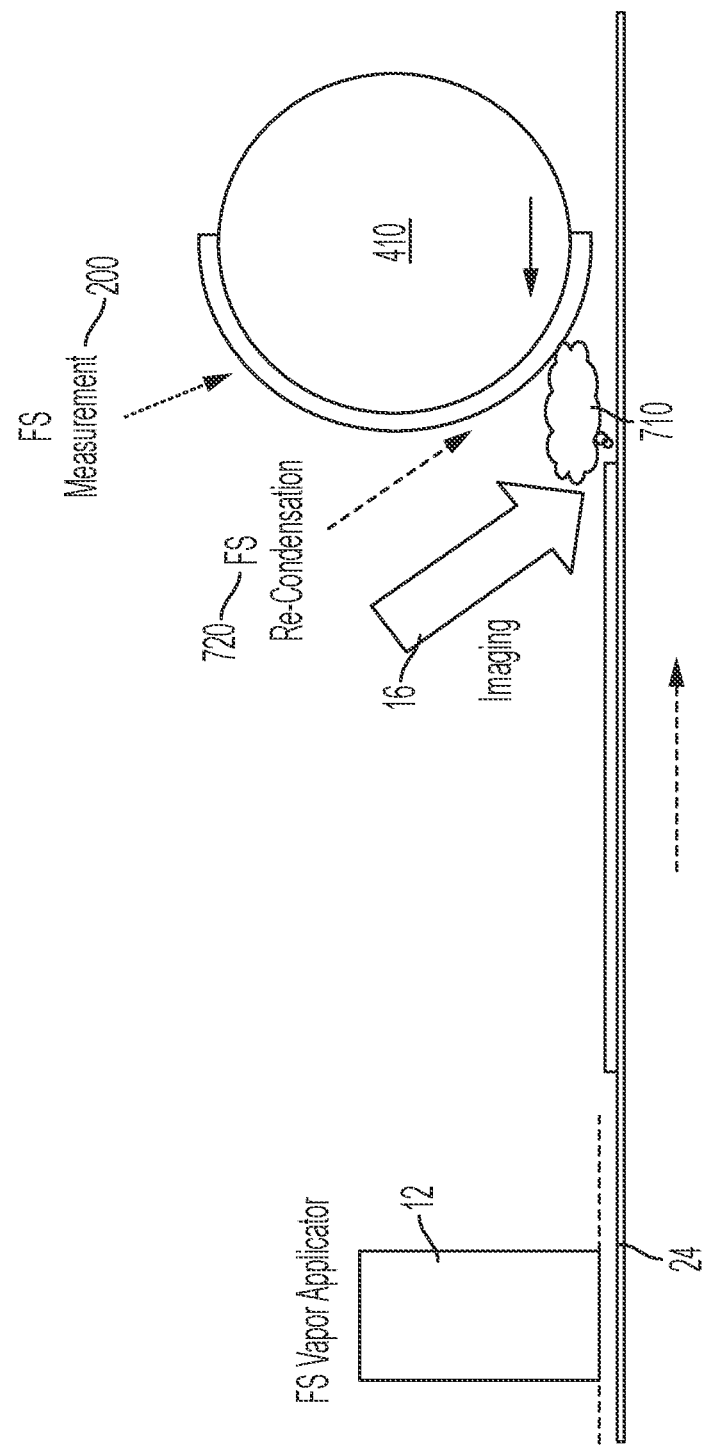
FIG. 7 shows the use of a transfer roll between the laser and the inker at FIG. 1 where the imaging laser evaporates the fountain solution on the imaging blanket to allow the vapor to re-condense on the grating surface of a transfer roll in accordance to an embodiment.

FIG. 7 shows the use of a transfer roll between the laser and the inker at FIG. 1 where the imaging laser evaporates the fountain solution on the imaging blanket to allow the vapor to re-condense on the grating surface of a transfer roll in accordance to an embodiment.

FIG. 7 illustrates the use of evaporation 710 and re-condensation 720 transfer method during non-printing cycles. In this embodiment it is proposed using a transfer roll 410 between the laser 16 and the inkering apparatus 18 which ideally right after the imaging laser. Since printing is not being performed during the measurement cycle on can use the imaging laser 16 to evaporate 710 the FS on the blanket 24, while disabling the vapor collection subsystem, to allow the vapor to re-condense on the grating surface 200 of the transfer roll 410.

Figure 8:
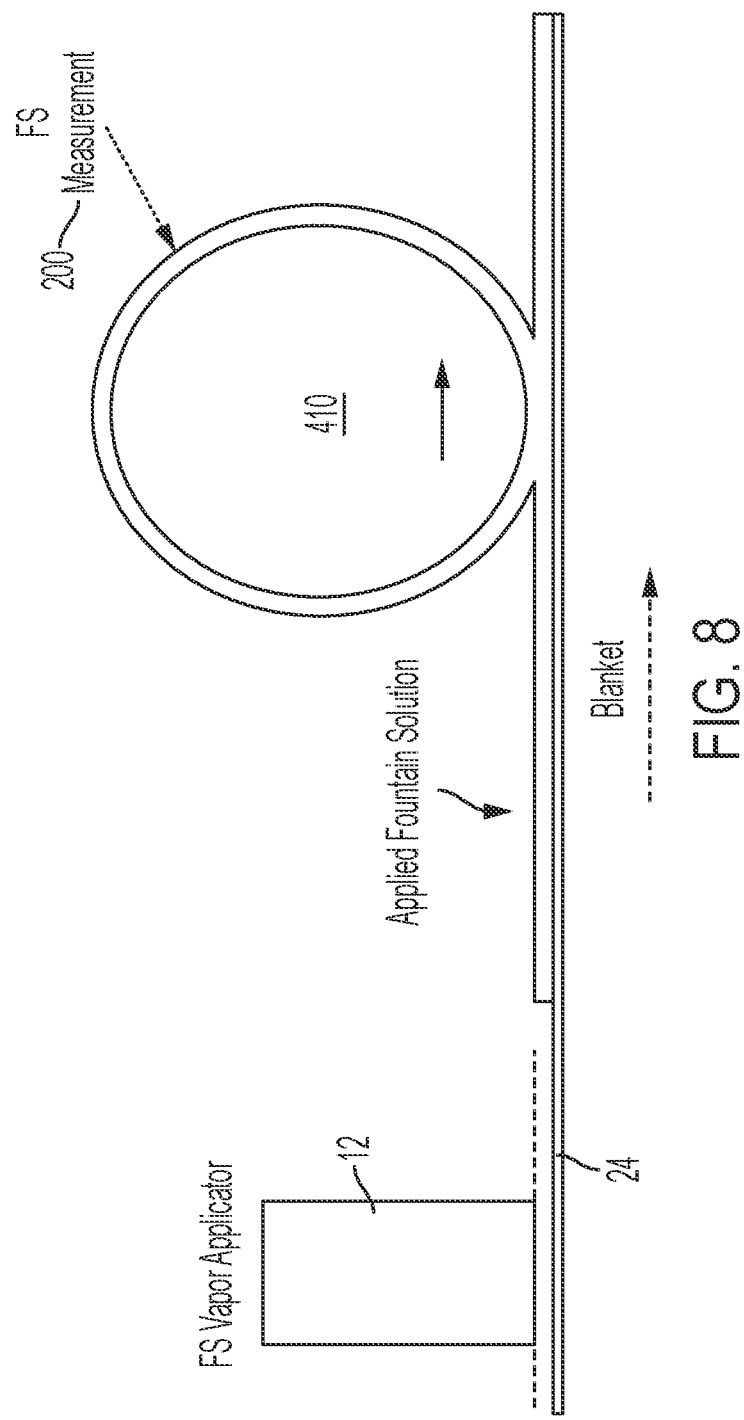
FIG. 8 shows the use a transfer roll, immediately following fountain solution application, to pick up the fountain solution from the imaging blanket to measure in accordance to an embodiment.

FIG. 8 shows the use a transfer roll, immediately following fountain solution application, to pick up the fountain solution from the imaging blanket to measure in accordance to an embodiment. FIG. 8 illustrates a continuous real time FS thickness monitoring. In this embodiment, there is proposed using a transfer roll 410 immediately following the FS application at applicator 12. The transfer roll 410 can operate in the film splitting mode to pick up the FS from the blanket 24. Measurements from the grating surface 200 of the transfer roll 410 can be performed across the full-width simultaneously in real time. Additionally, the measurement of the grating surface can be used by controller 60 to enable process control, including uniformity control across the process direction using well known process control arrangements.

FIG. 9 is a block diagram of a controller 900 with a processor for executing instructions to automatically control devices in the digital image forming device depicted in FIG. 1. The exemplary control system 900 may provide input, to or be a component of a controller for executing the image forming process in a system such as that depicted in FIG. 1 and to perform the fountain solution measurement using optical grating 200 in the arrangements described with reference to FIGS. 4-8.

The exemplary control system 900 may include an operating interface 910 by which a user may communicate with the exemplary control system 900. The operating interface 910 may be a locally-accessible user interface associated with an image forming device like image forming device 10. The operating interface 910 may be configured as one or more conventional mechanism common to control devices and/or computing devices that may permit a user to input information to the exemplary control system 900. The operating interface 910 may include, for example, a conventional keyboard, a touchscreen with "soft" buttons or with various components for use with a compatible stylus, a microphone by which a user may provide oral commands to the exemplary control system 900 to be "translated" by a voice recognition program, or other like device by which a user may communicate specific operating instructions to the exemplary control system 900. The operating interface 910 may be a part or a function of a graphical user interface (GUI) mounted on, integral to, or associated with, the AM 3D object forming device with which the exemplary control system 900 is associated.

The exemplary control system 900 may include one or more local processors 920 for individually operating the exemplary control system 900 and for carrying into effect control and operating functions for image forming device 10, and specifically for implementing process control of the various subsystem of imaging device 10 and FS measurement. Processor(s) 920 may include at least one conventional processor or microprocessor that interpret and execute instructions to direct specific functioning of the exemplary control system 900, and control of image forming device 10 with the exemplary control system 900.

The exemplary control system 900 may include one or more data storage devices 930. Such data storage device(s) 930 may be used to store data or operating programs to be used by the exemplary control system 900, and specifically the processor(s) 930. Data storage device(s) 930 may be used to store information regarding, for example, one or more control method, imaging sequences, and instructions for performing measurement of fountain solution with an interference optical element 980 such as grating surface 200. Data storage device 930 may be used to store a reference image, for example, of a substrate known to have provided a suitable object.

The interference optical elements 980 may comprise an interferometer forming an interference fringe concerning a measurement point of a measurement target using extended monochromatic light having coherence; a camera photographing the interference fringe to output an interference fringe image; and a processing part generating a curve-fitted phase shift curve using phases and incidence angles respectively corresponding to a plurality of peaks and a plurality of valleys in the interference fringe image and calculating thickness of the measurement target like fountain solution 230 using the phase shift curve. The processing part may include: an image grabber storing the interference fringe image; a thickness calculator at processor 920 receiving the stored interference fringe image to calculate coarse thickness information between the top surface and the bottom surface of the fountain solution using information of two points among peaks and valleys in the interference fringe image; a phase shift curve generator generating a curve-fitted phase shift curve using phases and incidence angles respectively corresponding to a plurality of peaks and a plurality of valleys in the interference fringe image and extracting a center phase corresponding to a center point of the interference fringe using the curve-fitted phase shift curve; an interference signal order extractor extracting an interference signal order of the center point of the interference fringe image using the thickness information or improved thickness information and the center phase; and a thickness calculator calculating fine thickness between the top surface and the bottom surface of the measurement target (FS) using the interference signal order of the center point of the interference fringe image and the center phase corresponding to the center point of the interference fringe.

The data storage device(s) 930 may include a random access memory (RAM) or another type of dynamic storage device that is capable of storing updatable database information, and for separately storing instructions for execution of system operations by, for example, processor(s) 920. Data storage device(s) 930 may also include a read-only memory (ROM), which may include a conventional ROM device or another type of static storage device that stores static information and instructions for processor(s) 920. Further, the data storage device(s) 930 may be integral to the exemplary control system 900, or may be provided external to, and in wired or wireless communication with, the exemplary control system 900, including as cloud-based data storage components.

The exemplary control system 900 may include at least one data output/display device 940, which may be configured as one or more conventional mechanism that output information to a user, including, but not limited to, a display screen on a GUI of an image forming device with which the exemplary control system 900 may be associated. The display device 940 can also include Augmented Reality (AR) hardware, such as that used in AR head-mounted displays (HMD), AR Eyeglasses, or AR Head-Up-Display (HUD) technology. The data output/display device 940 may be used to indicate to a user a status of an image forming or FS measurement operation effected by the device with which the exemplary control system 900 may be associated including an operation of one or more individually controlled components at one or more of a plurality of separate processing stations in the device.

The exemplary control system 900 may include one or more separate external communication interfaces 950 by which the exemplary control system 900 may communicate with components external to the exemplary control system 900. At least one of the external communication interfaces 950 may be configured as an input port to support connecting an external CAD/CAM device storing information for execution of the control functions of image forming device 10. Any suitable data connection to provide wired or wireless communication between the exemplary control system 900 and external and/or associated components is contemplated to be encompassed by the depicted external communication interface 950.

The exemplary control system 900 may include a print command processing unit 960, which may be a part or a function of processor 920 coupled to, for example, one or more storage devices 930, or may be a separate stand-alone component module or circuit in the exemplary control system 900. The print command processing unit 960 may review control and image data that specify an image forming operation to be carried out by the image forming device 10. The print command processing unit 960 may then control the image forming operation in the image forming device according to the control and image data, and particularly control FS levels, imaging, inking levels in one or more processed image receiving media substrates output from the image forming device 10.

The exemplary control system 900 may include diffractive optical elements comprising grating surface 200, optical source like laser 16, and detector for registering the diffraction pattern created by grating surface 200. The detector can be a CCD detector or any appropriate sensor may be used such as a CMOS sensor, film strip, or paper and the like.

All of the various components of the exemplary control system 900, as depicted in FIG. 9, may be connected internally, and to one or more image forming devices 10, by one or more data/control busses 970. These data/control busses 970 may provide wired or wireless communication between the various components of the exemplary control system 900, whether all of those components are housed integrally in, or are otherwise external and connected to an image forming device with which the exemplary control system 900 may be associated.

It should be appreciated that, although depicted in FIG. 9 as an integral unit, the various disclosed elements of the exemplary control system 900 may be arranged in any combination of sub-systems as individual components or combinations of components, integral to a single unit, or external to, and in wired or wireless communication with the single unit of the exemplary control system 900. In other words, no specific configuration as an integral unit or as a support unit is to be implied by the depiction in FIG. 9. Further, although depicted as individual units for ease of understanding of the details provided in this disclosure regarding the exemplary control system 900, it should be understood that the described functions of any of the individually-depicted components, and particularly each of the depicted control units, may be undertaken, for example, by one or more processors 920 connected to, and in communication with, one or more data storage device(s) 930. The computer/controller 900 would have augmented reality controller with instructions in a storage device to, based on the collected data from the image sensor such as optical sensor 460, determine a virtual object to be presented in a field of view, a position of the virtual object in the field of view, and a perspective of the simulated object in the field of view. Augmented reality controllers are well known to those in the augmented reality art and need not be discussed in more detail.

Figure 10:
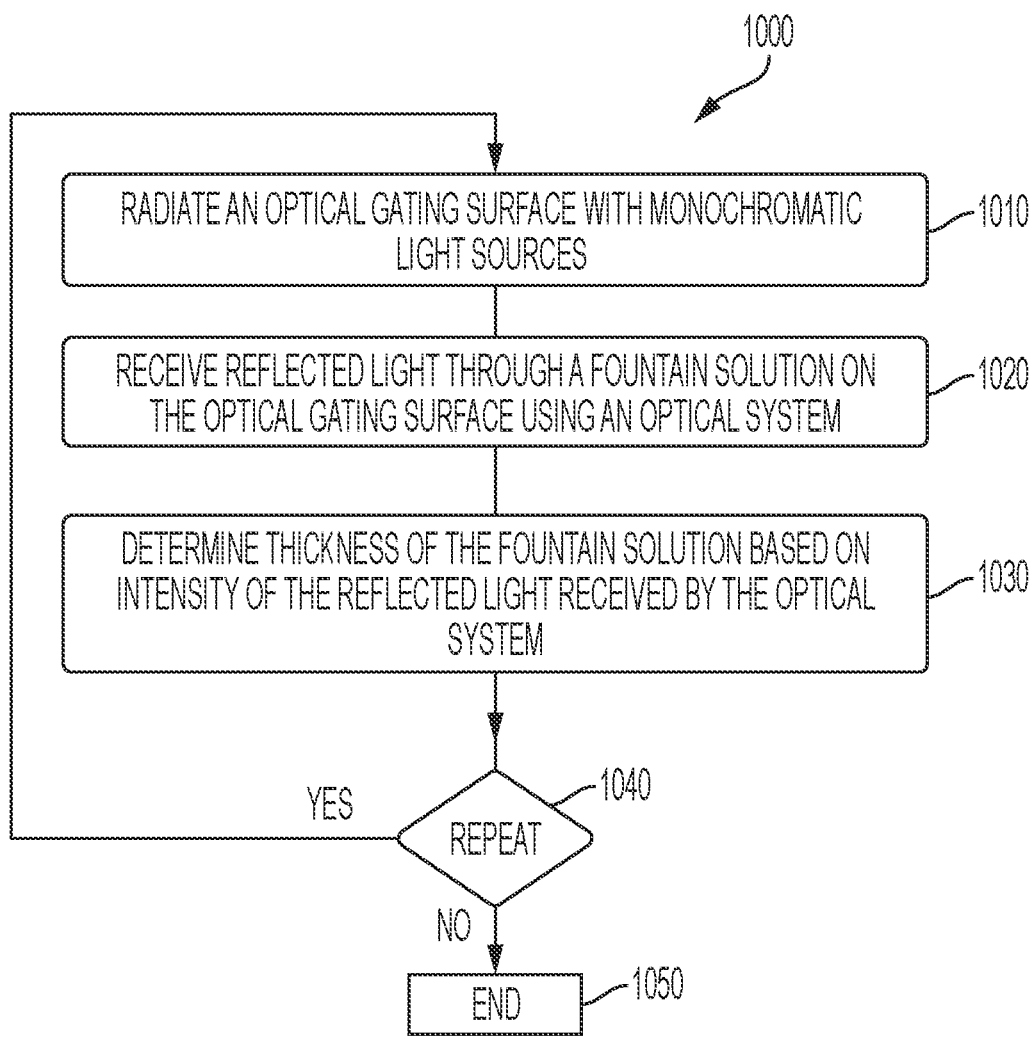
FIG. 10 is a flowchart depicting the operation of an exemplary method to directly measure fountain solution for use in a digital image forming device.

The disclosed embodiments may include an exemplary method for measuring fountain solution thickness. FIG. 10 is a flowchart depicting the operation of an exemplary method to directly measure fountain solution for use in a digital image forming device.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 10, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Method 1000 begins with action 1010 with radiating 210 the optical gating surface 200 varying in a periodic fashion with a light source using two monochromatic light sources with a constant phase shift. As noted earlier the optical gating surface 200 could be on the imaging blanket 24 or an external substrate. Control is then passed action 1020 where a detector receive emitting light through a fountain solution from the gating surface 200 using an optical system such as a sensor or other imaging capturing devices. Control is then passed to action 1030 where the system or operator determines thickness of the fountain solution based on intensity of the reflected light received by the optical system at action 1020. In action 1040, the steps of 1010, 1020, and 1030 are repeated like when engaging real-time and continuous determination of fountain solution thickness or method 1000 is ended at action 1050 until the process is invoked again by the system or operator.

Those skilled in the art will appreciate that other embodiments of the disclosed subject matter may be practiced with many types of image forming elements common to offset inking system in many different configurations. For example, although digital lithographic systems and methods are shown in the discussed embodiments, the examples may apply to analog image forming systems and methods, including analog offset inking systems and methods. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method to measure fountain solution thickness for variable data lithography printing via an imaging member having an arbitrarily reimageable imaging surface for transferring an ink image to a receiving substrate, comprising:
   applying a coating of fountain solution to the imaging member having the arbitrarily reimageable imaging surface via a fountain solution vapor supply;
   transferring a portion of the fountain solution coating on the imaging member onto an optical gating surface of a fountain solution carrier roll as a fountain solution layer;
   radiating with an extended phase shifted monochromatic light source to a measurement point of the optical gating surface of the fountain solution carrier roll, the fountain solution carrier roll being adjacent the imaging member and having the optical gating surface as a noninktransferable optical gating surface, the fountain solution carrier roll being a non ink transfer roll absent ink and saturated with the fountain solution layer;
   receiving reflected light from a top surface of the fountain solution layer and from the measurement point using an optical system, while the light reflected from the measurement point is received after traveling through the fountain solution layer at the optical gating surface;
   wherein the received reflected light forms an interference pattern obtained by an optical path length differences associated with the reflected light from the top surface and the measurement point; and
   determining thickness of the fountain solution layer at the optical gating surface based on reflected light intensity at the interference pattern.

2. The method in accordance with claim 1, wherein the optical gating surface substantially reflects the extended phase shifted monochromatic light.

3. The method in accordance to claim 1, wherein the light source includes two monochromatic light sources having a constant phase shift, the method further comprising modulating the two monochromatic light sources via Cos(θ1/2) therebetween.

4. The method in accordance to claim 1, wherein the transferring is direct splitting contact transfer of the portion of the fountain solution coating on the imaging member to the optical gating surface of the fountain solution carrier roll.

5. The method in accordance to claim 1, wherein the transferring is evaporating the portion of the fountain solution coating on the imaging member and re-condensing the portion on the optical gating surface of the fountain solution carrier roll.

6. The method in accordance to claim 1, the method further comprising:
using the fountain solution carrier roll to apply the layer of fountain solution to the imaging member having the arbitrarily reimageable imaging surface for transferring an ink image to the receiving substrate.

7. The method in accordance to claim 1, further comprising applying the fountain solution layer to the optical gating surface via a fountain solution vapor supply, wherein the optical gating surface is placed on the fountain solution carrier roll to directly measure the fountain solution layer thickness, and then transferring the fountain solution layer to the imaging member.

8. An ink-based digital printing system useful for ink printing via an imaging member having an arbitrarily reimageable imaging surface for transferring an ink image to a receiving substrate, comprising:
a fountain solution carrier roll adjacent the imaging member and having a noninktransferable optical gating surface, the fountain solution carrier roll being a non ink transfer roll absent ink and saturated with a layer of fountain solution;
a light source for outputting an extended phase shifted monochromatic light source to a measurement point of the optical gating surface under the fountain solution layer;
an optical subsystem to receive reflected light from a top surface of the fountain solution layer and from the measurement point, while the light reflected from the measurement point is received after traveling through the fountain solution layer at the optical gating surface, the light source including two monochromatic light sources having a constant phase shift modulated via Cos (θ1/2) therebetween;
wherein the received reflected light forms an interference pattern obtained by an optical path length differences associated with the reflected light from the top surface and the measurement point; and
a controller having
a storage device coupled to a processor, wherein the storage device comprises instructions which, when executed by the processor, cause the processor to determine fountain solution layer thickness for variable data lithography printing by:
determining the thickness of the fountain solution layer at the optical gating surface based on reflected light intensity at the interference pattern.

9. The ink-based digital printing system of claim 8, wherein the optical gating surface substantially reflects the extended phase shifted monochromatic light.

10. The ink-based digital printing system in accordance to claim 8, the controller providing input to a fountain solution vapor supply to apply a coating of fountain solution to the imaging member having the arbitrarily reimageable imaging surface.

11. The ink-based digital printing system in accordance to claim 10, the optical gating surface of the fountain solution carrier roll receiving a portion of the fountain solution coating from the imaging member as the fountain solution layer.

12. The ink-based digital printing system in accordance to claim 11, wherein the transferring is direct splitting contact transfer of the portion of the fountain solution coating on the imaging member to the optical gating surface of the fountain solution carrier roll.

13. The ink-based digital printing system in accordance to claim 11, wherein the transferring is evaporating the portion of the fountain solution coating on the imaging member and re-condensing the portion on the optical gating surface of the fountain solution carrier roll.

14. The ink-based digital printing system in accordance to claim 8, the fountain solution carrier roll configured to apply the layer of fountain solution to the imaging member having the arbitrarily reimageable imaging surface for transferring an ink image to the receiving substrate.

15. The ink-based digital printing system in accordance to claim 8, the controller providing input to a fountain solution vapor supply to apply the fountain solution layer to the optical gating surface, wherein the optical gating surface is located on the fountain solution carrier roll to directly measure the fountain solution layer thickness before the fountain solution layer is transferred to the imaging member.

16. A fountain solution measurement device useful for an ink-based digital printing system used for ink printing via an imaging member having an arbitrarily reimageable imaging surface for transferring an ink image to a receiving substrate, comprising:
a fountain solution carrier roll adjacent to the imaging member and having a noninktransferable optical gating surface, the fountain solution carrier roll being a non ink transfer roll absent ink and saturated with a layer of fountain solution;
a light source for outputting an extended phase shifted monochromatic light source to a measurement point of the optical gating surface under the fountain solution layer;
an optical subsystem to receive reflected light from a top surface of the fountain solution layer and from the measurement point, while the light reflected from the measurement point is received after traveling through the fountain solution layer at the optical gating surface;
wherein the received reflected light forms an interference pattern obtained by an optical path length differences associated with the reflected light from the top surface and the measurement point; and
a controller configured to determine the thickness of the fountain solution layer at the optical gating surface based on reflected light intensity at the interference pattern, the controller providing input to a fountain solution vapor supply to apply a coating of fountain solution to the imaging member having the arbitrarily reimageable imaging surface, the optical gating surface of the fountain solution carrier roll receiving a portion of the fountain solution coating from the imaging member as the fountain solution layer.

* * * * *